United States Patent
Gabrielson

(10) Patent No.: US 10,454,899 B1
(45) Date of Patent: Oct. 22, 2019

(54) CONTROLLING FIREWALL PORTS IN VIRTUALIZED ENVIRONMENTS THROUGH PUBLIC KEY CRYPTOGRAPHY

(71) Applicant: Amazon Technologies, Inc., Seattle, WA (US)

(72) Inventor: Jacob Adam Gabrielson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/659,367

(22) Filed: Mar. 16, 2015

(51) Int. Cl.
*H04L 29/06* (2006.01)
*H04L 9/32* (2006.01)

(52) U.S. Cl.
CPC ........ *H04L 63/0428* (2013.01); *H04L 9/3247* (2013.01); *H04L 9/3263* (2013.01); *H04L 2209/64* (2013.01); *H04L 2209/72* (2013.01)

(58) Field of Classification Search
CPC . H04L 63/0428; H04L 9/3247; H04L 9/3263; H04L 2209/64; H04L 2209/72
See application file for complete search history.

(56) References Cited

U.S. PATENT DOCUMENTS

| | | | | |
|---|---|---|---|---|
| 6,687,732 | B1* | 2/2004 | Bector | H04L 29/12009 709/200 |
| 7,161,947 | B1* | 1/2007 | Desai | H04L 67/06 370/389 |
| 7,340,600 | B1* | 3/2008 | Corella | H04L 63/0823 713/155 |
| 7,698,565 | B1* | 4/2010 | Bjorn | G06F 21/32 382/115 |
| 8,843,740 | B2 | 9/2014 | Brown et al. | |
| 9,380,028 | B2* | 6/2016 | Rizzo | H04L 63/0272 |
| 9,467,424 | B2* | 10/2016 | Gluck | H04L 63/0281 |
| 9,736,149 | B2* | 8/2017 | Bettenburg | H04L 63/083 |
| 2003/0046544 | A1 | 3/2003 | Roskind | |
| 2003/0110379 | A1* | 6/2003 | Ylonen | H04L 12/4604 713/164 |
| 2004/0103205 | A1* | 5/2004 | Larson | H04L 63/10 709/229 |

(Continued)

FOREIGN PATENT DOCUMENTS

JP 2005130447 5/2005

OTHER PUBLICATIONS

Blake-Wilson et al., "Elliptic Curve Cryptography (ECC) Cipher Suites for Transport Layer Security (TLS)," Request for Comments: 4492, Informational, May 2006, 36 pages.

(Continued)

*Primary Examiner* — Sher A Khan
(74) *Attorney, Agent, or Firm* — Davis Wright Tremaine LLP

(57) ABSTRACT

A system and method for client authentication wherein a client computing system is authenticated by at least performing, at an authentication system different than a target computing system, a set of validation operations on authorization information addressed to a destination port of the target computing system, and, as a result of the client computing system being authenticated by the set of validation operations, switching to a mode wherein a port of the target computing system is opened and data from the client computing system is communicated to the port of the target computing system.

20 Claims, 9 Drawing Sheets

(56) References Cited

U.S. PATENT DOCUMENTS

| | | | |
|---|---|---|---|
| 2004/0255037 A1* | 12/2004 | Corvari | H04L 63/0823 709/229 |
| 2005/0005133 A1* | 1/2005 | Xia | H04L 63/0807 713/185 |
| 2005/0015615 A1* | 1/2005 | Gonsalves | H04L 63/1408 726/26 |
| 2006/0005237 A1* | 1/2006 | Kobata | H04L 63/0823 726/12 |
| 2006/0047824 A1* | 3/2006 | Bowler | H04L 63/0236 709/229 |
| 2007/0248085 A1* | 10/2007 | Volpano | H04L 12/4679 370/389 |
| 2008/0289028 A1* | 11/2008 | Jansen | H04L 63/0281 726/11 |
| 2009/0013398 A1* | 1/2009 | Cookmeyer, II | H04L 43/10 726/11 |
| 2009/0113537 A1* | 4/2009 | Woo | H04L 63/0823 726/12 |
| 2009/0282471 A1* | 11/2009 | Green | H04L 63/029 726/12 |
| 2010/0058057 A1* | 3/2010 | Sutherland | G06F 8/65 713/168 |
| 2010/0106817 A1* | 4/2010 | Jang | H04L 29/12471 709/223 |
| 2010/0131658 A1* | 5/2010 | Goyal | H04L 65/105 709/228 |
| 2010/0268942 A1 | 10/2010 | Hernandez-Ardieta et al. | |
| 2011/0019600 A1* | 1/2011 | Ping | G06F 1/3203 370/311 |
| 2011/0051720 A1* | 3/2011 | Hamada | H04L 12/66 370/352 |
| 2011/0179136 A1* | 7/2011 | Twitchell, Jr. | H04L 45/586 709/217 |
| 2012/0174196 A1* | 7/2012 | Bhogavilli | H04L 63/1458 726/5 |
| 2012/0210123 A1 | 8/2012 | Castelnuovo et al. | |
| 2013/0031462 A1* | 1/2013 | Calvo | G06F 9/545 715/234 |
| 2013/0145155 A1 | 6/2013 | Liu et al. | |
| 2013/0254535 A1 | 9/2013 | Akehurst et al. | |
| 2013/0275750 A1 | 10/2013 | Grajek et al. | |
| 2013/0329599 A1* | 12/2013 | Barkan | H04L 45/02 370/254 |
| 2014/0082419 A1* | 3/2014 | Untinen | H04L 43/18 714/27 |
| 2014/0096194 A1* | 4/2014 | Bhogavilli | H04L 63/0236 726/3 |
| 2014/0150095 A1* | 5/2014 | Zhao | H04L 29/06 726/22 |
| 2014/0244851 A1* | 8/2014 | Lee | H04L 45/54 709/228 |
| 2015/0222604 A1* | 8/2015 | Ylonen | H04L 63/062 713/171 |
| 2016/0173287 A1* | 6/2016 | Bowen | H04L 9/321 713/156 |

OTHER PUBLICATIONS

Blake-Wilson et al., "Transport Layer Security (TLS) Extensions," Request for Comments: 3546, Standards Track, Jun. 2003, 28 pages.
Blake-Wilson et al., "Transport Layer Security (TLS) Extensions," Request for Comments: 4366, Standards Track, Apr. 2006, 29 pages.
Blumenthal et al., "Pre-Shared Key (PSK) Ciphersuites with NULL Encryption for Transport Layer Security (TLS)," Request for Comments: 4785, Standards Track, Jan. 2007, 6 pages.
Brown et al., "Transport Layer Security (TLS) Authorization Extensions," Request for Comments: 5878, Experimental, May 2010, 19 pages.
Chown, "Advanced Encryption Standard (AES) Ciphersuites for Transport Layer Security (TLS)," Request for Comments: 3268, Standards Track, Jun. 2002, 8 pages.
Cooper et al., "Internet X.509 Public Key Infrastructure Certificate and Certificate Revocation List (CRL) Profile," NIST, May 2008, RFC 5280, 141 pages.
Dierks et al., "The Transport Layer Security (TLS) Protocol Version 1.2," Request for Comments: 5246, Standards Track, Aug. 2008, 98 pages.
Dierks et al., "The TLS Protocol Version 1.0," Request for Comments: 2246, Standards Track, Jan. 1999, 75 pages.
Eastlake, "Transport Layer Security (TLS) Extensions: Extension Definitions," Request for Comments: 6066, Standards Track, Jan. 2011, 25 pages.
Eronen et al., "Pre-Shared Key Ciphersuites for Transport Layer Security (TLS)," Request for Comments: 4279, Standards Track, Dec. 2005, 16 pages.
Ford-Hutchinson, "Securing FTP with TLS," Request for Comments: 4217, Standards Track, Oct. 2005, 29 pages.
Friend, "Transport Layer Security (TLS) Protocol Compression Using Lempel-Ziv-Stac (LZS)," Request for Comments: 3943, Informational, Nov. 2004, 13 pages.
Gutmann, "Encrypt-then-MAC for Transport Layer Security (TLS) and Datagram Transport Layer Security (DTLS)," Request for Comments: 7366, Standards Track, Sep. 2014, 7 pages.
Hoffman, "SMTP Service Extension for Secure SMTP over Transport Layer Security," Request for Comments: 3207, Standards Track, Feb. 2002, 9 pages.
Hollenbeck, "Transport Layer Security Protocol Compression Methods," Request for Comments: 3749, Standards Track, May 2004, 8 pages.
International Search Report and Written Opinion dated Sep. 21, 2016, International Patent Application No. PCT/US2015/065634, filed Dec. 14, 2015.
Kanno et al., "Addition of the Camellia Cipher Suites to Transport Layer Security (TLS)," Request for Comments: 6367, Informational, Sep. 2011, 9 pages.
Kato et al., "Camellia Cipher Suites for TLS," Request for Comments: 5932, Standards Track, Jun. 2010, 7 pages.
Khare et al., "Upgrading to TLS Within HTTP/1.1," Request for Comments: 2817, Standards Track, May 2000, 13 pages.
Kim et al., "Addition of the ARIA Cipher Suites to Transport Layer Security (TLS)," Request for Comments: 6209, Informational, Apr. 2011, 10 pages.
Lee et al., "Addition of Seed Cipher Suites to Transport Layer Security (TLS)," Request for Comments: 4162, Standards Track, Aug. 2005, 7 pages.
Mavrogiannopoulos, "Using OpenPGP Keys for Transport Layer Security (TLS) Authentication," Request for Comments: 5081, Experimental, Nov. 2007, 9 pages.
Mavrogiannopoulos et al., "Using OpenPGP Keys for Transport Layer Security (TLS) Authentication," Request for Comments: 6091, Informational, Feb. 2011, 9 pages.
McGrew et al., "AES-CCM Cipher Suites for Transport Layer Security (TLS)," Request for Comments: 6655, Standards Track, Jul. 2012, 8 pages.
McGrew et al., "Datagram Transport Layer Security (DTLS) Extension to Establish Keys for the Secure Real-time Transport Protocol (SRTP)," Request for Comments: 5764, Standards Track, May 2010, 27 pages.
Medvinsky et al., "Addition of Kerberos Cipher Suites to Transport Layer Security (TLS)," Request for Comments: 2712, Standards Track, Oct. 1999, 7 pages.
Merkle et al., "Elliptic Curve Cryptography (ECC) Brainpool Curves for Transport Layer Security (TLS)," Request for Comments: 7027, Informational, Oct. 2013, 11 pages.
Moriai et al., "Addition of Camellia Cipher Suites to Transport Layer Security (TLS)," Request for Comments: 4132, Standards Track, Jul. 2005, 8 pages.
Newman, "Using TLS with IMAP, POP3 and ACAP," Request for Comments: 2595, Standards Track, Jun. 1999, 16 pages.
Phelan, "Datagram Transport Layer Security (DTLS) over the Datagram Congestion Control Protocol (DCCP)," Request for Comments: 5238, Standards Track, May 2008, 11 pages.
Rescorla, "HTTP Over TLS," Request for Comments: 2818, Informational, May 2000, 8 pages.

(56) References Cited

OTHER PUBLICATIONS

Rescorla, "TLS Elliptic Curve Cipher Suites with SHA-256/384 and AES Galois Counter Mode (GCM)," Request for Comments: 5289, Informational, Aug. 2008, 7 pages.
Rescorla et al., "Datagram Transport Layer Security Version 1.2," Request for Comments: 6347, Standards Track, Jan. 2012, 33 pages.
Rescorla et al., "Datagram Transport Layer Security," Request for Comments: 4347, Standards Track, Apr. 2006, 26 pages.
Rescorla et al., "Transport Layer Security (TLS) Renegotiation Indication Extension," Request for Comments: 5746, Standards Track, Feb. 2010, 16 pages.
Salowey et al., "AES Galois Counter Mode (GCM) Cipher Suites for TLS," Request for Comments: 5288, Standards Track, Aug. 2008, 9 pages.
Salowey et al., "Transport Layer Security (TLS) Session Resumption without Server-Side State," Request for Comments: 5077, Standards Track, Jan. 2008, 21 pages.
Salter et al., "Suite B Profile for Transport Layer Security (TLS)," Request for Comments: 6460, Informational, Jan. 2012, 15 pages.
Santesson, "TLS Handshake Message for Supplemental Data," Request for Comments: 4680, Standards Track, Sep. 2006, 10 pages.
Santesson et al., "TLS User Mapping Extension," Request for Comments: 4681, Standards Track, Oct. 2006, 11 pages.
Taylor et al., "Using the Secure Remote Password (SRP) Protocol for TLS Authentication," Request for Comments: 5054, Informational, Nov. 2007, 25 pages.
Tuexen et al., "Datagram Transport Layer Security (DTLS) for Stream Control Transmission Protocol (SCTP)," Request for Comments: 6083, Standards Track, Jan. 2011, 10 pages.
Turner et al., "Prohibiting Secure Sockets Layer (SSL) Version 2.0," Request for Comments: 6176, Standards Track, Mar. 2011, 4 pages.
Canadian Office Action for Patent Application No. 2,969,237 dated Mar. 20, 2018, 12 pages.
Housley et al., Internet X.509 Public Key Infrastructure Certificate and CRL Profile, RFC 2459, Jan. 1999, 159 pages.
Japanese Office Action for Patent Application No. 2017-529776 dated Jun. 19, 2018, 7 pages.
Australian Notice of Acceptance, dated Aug. 29, 2018, for Patent Application No. 2015384754, 3 pages.
European Communication under Rule 71(3) EPC, dated Sep. 19, 2018, for Patent Application No. 15871326.3, 57 pages.
Japanese Decision for Grant, dated Apr. 23, 2019, for Patent Application No. 2017-529776, 3 pages.
Canadian Notice of Allowance for Patent Application No. 2,969,237 dated Mar. 7, 2019, 1 page.
Korean Notice of Preliminary Rejection for Patent Application No. 10-2017-7018303 dated Jan. 29, 2019, 16 pages.
European Extended Search Report for Application No. 19152269.7 dated May 13, 2019, 8 pages.
Chinese First Office Action, dated Jul. 2, 2019, for Patent Application No. 21580066378.4, 27 pages.
European Communication Rule 69, dated Jun. 17, 2019, for Patent Application No. 19152269.7, 2 pages.

\* cited by examiner

CONTROLLING FIREWALL PORTS IN VIRTUALIZED ENVIRONMENTS THROUGH PUBLIC KEY CRYPTOGRAPHY

CROSS REFERENCE TO RELATED APPLICATIONS

This application incorporates by reference for all purposes the full disclosure of co-pending U.S. patent application Ser. No. 14/570,867, filed Dec. 15, 2014, entitled "SHORT-DURATION DIGITAL CERTIFICATE ISSUANCE BASED ON LONG-DURATION DIGITAL CERTIFICATE VALIDATION."

BACKGROUND

Managing firewalls that control incoming and outgoing network traffic for various networks within a datacenter can be very complicated, particularly when large numbers of physical and/or virtual computing systems are involved. On the one hand, it is important to close unused network ports in the firewalls to block harmful or unwanted network traffic from degrading the performance of the network or the computing systems within the network. On the other hand, some network ports for computing systems need to be open to allow important network traffic to flow. Unfortunately, opening and closing firewall ports is usually a manual process that involves explicitly opening/closing ports or implementing static rules, which can be time-consuming, error-prone, and difficult to audit. Furthermore, once opened, ports will remain open until expressly closed, which can present a security concern when ports that are no longer being used are left open. However, closing the opened ports runs the risk of inadvertently closing ports that are still being used, which can cause important network traffic between client systems and their target servers to be interrupted.

BRIEF DESCRIPTION OF THE DRAWINGS

Various embodiments in accordance with the present disclosure will be described with reference to the drawings, in which.

DETAILED DESCRIPTION

Figure 1:
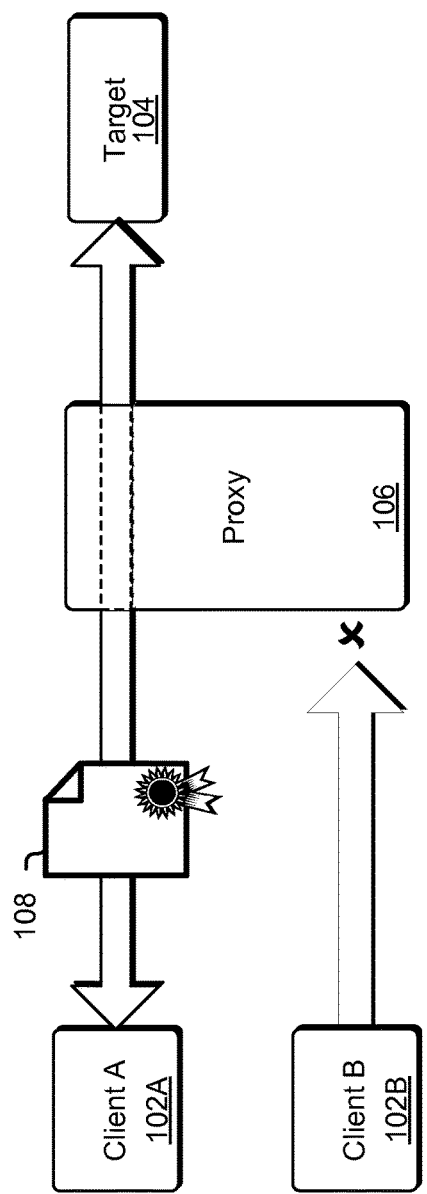
FIG. 1 illustrates an example of a proxy allowing a client with a validated certificate to communicate with a server in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include methods and systems for securely managing ports on a network. Such techniques include implementing a proxy to intercept client requests addressed to a port of a target computing system on the network. In some embodiments, the proxy intercepts the request directed to the target computing system undetectably to the client, whereas in other embodiments the client submits the request directly to the proxy. In order for a client request to be fulfilled, the client request may include a digital certificate issued from a certificate authority. In some implementations, the request also includes a digital signature of the client and/or an Internet Protocol (IP) address of the client. The system may determine whether the client is authorized to access the target computing system and confirm the identity of the client. In order to confirm the identity of the client, the system of the present disclosure may verify that the digital certificate is valid (e.g., unexpired), that the certificate authority that issued the digital certificate is specified as trusted, and that the signatures included in the request are authentic. In some implementations, the authentication of the client and the verification of the certificate is performed by one or more services, whereas in other implementations one or more of these functions are performed by the proxy.

Once the client and digital certificate have been fully authenticated and validated, the system may attempt to open the requested port on the target computing system for communication from the client to the target computing system. In some embodiments, this is performed by the proxy communicating a request to open the requested port to a port management service, which, in turn, makes a request to a port agent running on the target computing system. In some embodiments where the network is a virtual network, the proxy communicates the request to open the requested port to the port management service, which, in turn, opens the port via a virtual networking layer of the virtual network. In still other embodiments, the proxy performs the operations of the port management service itself.

Upon notification that the requested port has been opened for the client, the proxy may enable a pass-through mode for the client. In some cases, the pass-through mode enabled status is stored in a data store in association with the client. In some implementations, rather than implementing a pass-through mode on the proxy, the proxy communicates to a network management layer or virtual networking layer of the network that the client has been validated. The network management layer may subsequently reconfigure the network such that, for as long as the pass-through mode is enabled, future communications from the validated client to the target computing system need not pass through the proxy, but instead may be routed directly to the target computing system for as long as pass-through mode for the client is enabled. The client may then be notified that the requested port has been opened and, for as long as pass-through mode is enabled for the client, the client may communicate with the target computing system on the requested port.

The described and suggested techniques improve the field of computing, and specifically the field of network management, by providing a new and useful file system for client authentication and authorization. Additionally, the described and suggested techniques improve the functioning of computer systems by efficiently determining when to open and close network ports, thereby reducing possible degradation of network performance due to harmful and unwanted network traffic. Moreover, the described and suggested techniques offer meaningful advantages over general network management processes by improving security by validating port requests and opening/closing ports only as needed, reducing the risk of errors caused by premature port closure, and efficiently automating time-consuming processes.

FIG. 1 illustrates an aspect of an environment 100 in which an embodiment may be practiced. As illustrated in FIG. 1, the environment 100 may include one or more source devices, clients 102A-02B, attempting to establish communications on a port of a target computing system or resource, target 104, through a proxy 106, wherein the client 102A that provides valid authorization information 108 is permitted to access the target 104 while the client 102B is denied access because it has not provided valid authorization information.

Figure 9:
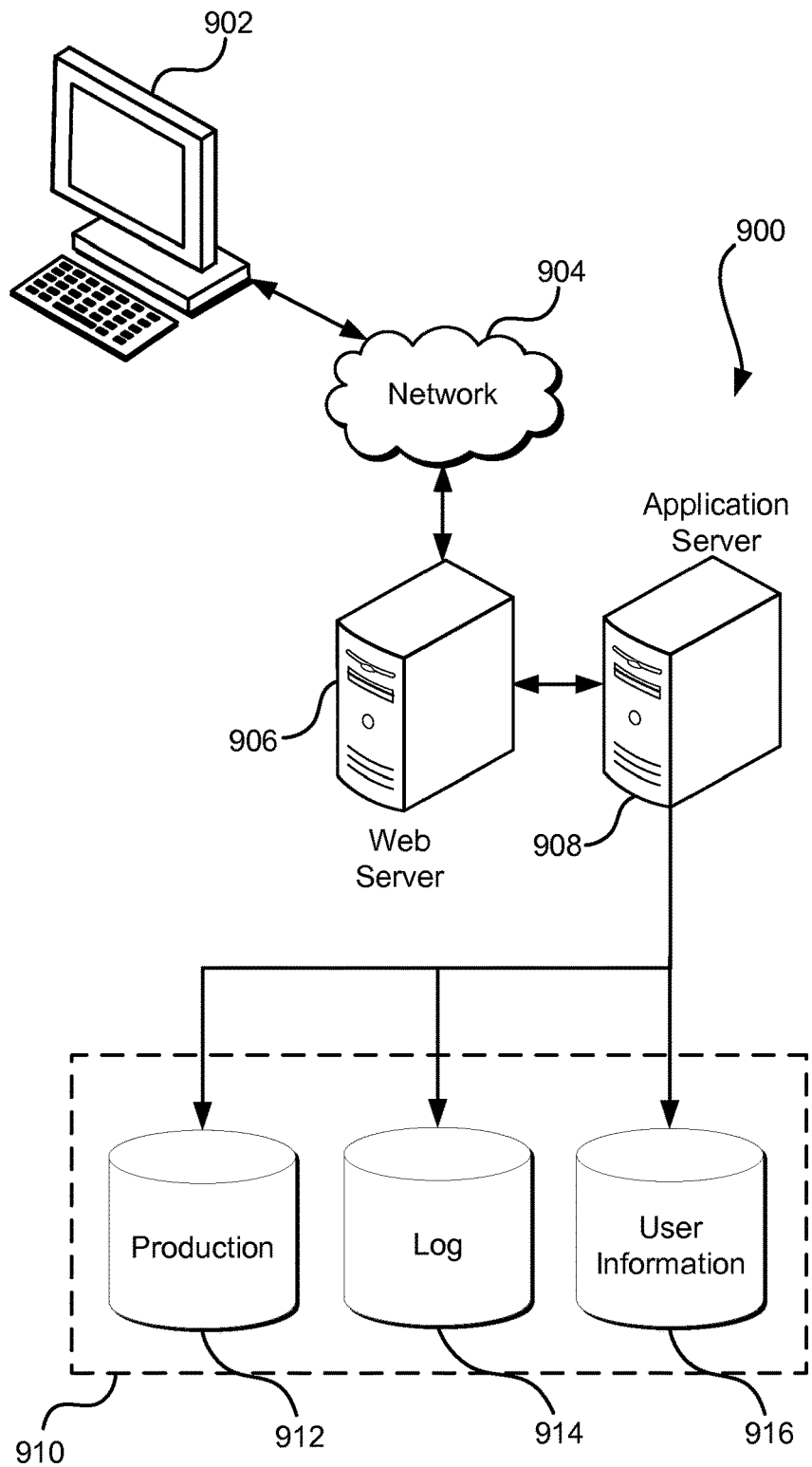
FIG. 9 illustrates an environment in which various embodiments can be implemented.

In some examples, a "client," such as the clients 102A-02B, may be any type of computing device, virtual or non-virtual, having the ability to communicate to another computing device, including a laptop computer, mobile telephone, wearable computing technology, virtual computer instance, or any electronic client device such as the electronic client device 902 described in conjunction with FIG. 9. A client may also be referred to as the "source" computing system in the present disclosure, indicating that the computing system is the source of the connection request.

The target 104 may also be any type of computing device, virtual or non-virtual, having the ability to respond to a client through one or more ports, including a data server, application server such as the application server 908, or web server such as the web server 906 of FIG. 9. In some examples, a "port" may refer to a construct serving as a communications endpoint in an operating system of a computing system for managing communication to/from multiple applications or processes on the same physical or virtual connection to a network, such as the Internet. In some implementations, the port is indicated by appending a port number to an Internet Protocol (IP) address of the target (also referred to as "destination") device (e.g., the target 104). Data may be routed to the target computing system associated with the destination IP address, and, at the device, the data may be further routed to the specific application or process identified with the specified port.

In many cases, the target computing system, such as the target 104, may have implemented a "firewall" to permit or deny communications based at least in part on a security policy. In some examples, this firewall may block one or more ports of the target computing system unless those ports are specifically "opened." In other words, communication packets received at the target computing system specifying the blocked (i.e., unopened) port may be ignored or may cause an error code to be sent to the source of the packets. However, in the present disclosure, such communications may be intercepted by the proxy 106. If the proxy 106 determines that the source can be trusted, the proxy 106 may communicate with a port management service (described below) to cause the requisite port to be opened on the appropriate target computing system (e.g., the target 104) and forward the communications to the appropriate target computing system.

The proxy 106 may be an application or device, virtual or non-virtual, configured to act as an intermediary for requests and/or other data received from clients outside of a network seeking access to resources from target computing systems within the network. For example, the clients 102A-02B may connect to the proxy 106, requesting some service, such as a file, connection, web page, or other resource available from the target 104 in the network, and the proxy 106 may evaluate the request and determine whether to forward the request to the target 104 or deny the request. In some embodiments, the proxy 106 is invisible to the clients 102A-02B; that is, the clients 102A-02B may not have any evidence that their communications are being intercepted by the proxy 106 rather than going directly to the target 104. Thus, the proxy may intercept requests from clients 102A-02B to access resources through a port on the target 104, and the target 104 may not be directly accessible outside its network except through the proxy. In some examples, the requests are to send data to a port of the target 104. In other examples, the request includes digitally-signed data addressed to the port of the target 104. In some implementations, when the request is received by the proxy 106, the proxy 106 may first respond by providing the requesting client with a digital certificate issued to the proxy 106 and, if the request did not include a digital certificate, a request to the respective client to provide the authorization information 108 for authentication. Upon being provided with the authorization information 108, the proxy 106 may make a determination whether a client can be trusted, and, upon a determination that a client can be trusted, such as by validating the authorization information 108. If a determination is made that the client can be trusted, the proxy 106 may permit the client to communicate with the target 104 through the specified port. Note that the present disclosure also contemplates that in some embodiments, a port range including the specified port may be opened rather than only opening the specified port.

The proxy 106 may indicate that the client 102A is permitted to communicate with the target 104 through the specified port by setting a pass-through mode (e.g., a setting internal to the proxy 106) particular to the client 102A, the target 104, and/or the particular port on the target 104. When the pass-through mode is set for the client 102A, the target 104, and/or the particular port, the proxy 106 may allow future communications between the client 102A and the target 104 on the particular port to pass through to the target 104 without further verification checks, and the client 102A may not need to re-submit the authorization information 108. In some implementations, the pass-through mode has a time limit or expiration date, such that the pass-through mode is disabled when it reaches the expiration date and the client 102A may thereby be required to periodically supply valid and verifiable authorization information to continue to communicate with the target 104. In some cases, once the client 102A is authorized, pass-through mode may be enabled indefinitely for the client 102A until expressly disabled (e.g., by a network administrator, by a security event trigger, by an express request from the client 102A or target 104 to disable pass-through mode for the client 102A, etc.). In some implementations, if the client 102A attempts to communicate with the target 104 on a different port, the client 102A will be required again to supply valid and verifiable authorization information to be allowed to communicate with the server on the different port. Likewise, in some implementations, if the client 102A attempts to communicate with a different server in the network, the client 102A will be required again to supply valid and verifiable authorization information to communicate with the different server. In other implementations, however, validation of the authorization information 108 by the proxy 106 gives license to the client 102A to communicate with the target 104 on multiple ports. Likewise, in other implementations, validation of the authorization information 108 by the proxy 106 gives license to the client 102 to communicate with multiple servers in the network.

The authorization information 108 may be a digital certificate issued to the client 102A from a certificate authority and a signature by the client 102A, usable to confirm the identity of the client 102A to the proxy and provide assurance to the proxy that the client 102A can be trusted to connect to the target 104A. In some embodiments, the authorization information 108 is a credential, such as a password, session identity, personal identification number, or other client identifying element. In still other embodiments, the authorization information 108 is a symmetric signature (i.e., without a certificate), information derived from a shared secret (e.g., a hash of a password), or other information that evidences (e.g., cryptographically proves) access to secret information, such as access to a private key of a public-private key pair, access to a shared secret, etc. In some implementations, the client 102A obtains the authorization information 108 by communicating with a certificate authority service and providing information sufficient for the certificate authority service to validate the identity of the client 102A. In some implementations, the authorization information 108 is a long-duration digital certificate or a short-duration digital certificate, such as the long-duration and short-duration digital certificates described in U.S. patent application Ser. No. 14/570,867, entitled "SHORT-DURATION DIGITAL CERTIFICATE ISSUANCE BASED ON LONG-DURATION DIGITAL CERTIFICATE VALIDATION," incorporated by reference in the present disclosure.

The authorization information 108 may be validated by the proxy 106, or the proxy 106 may request validation from an authorization service internal or external to the network. The validation of the authorization information 108 may involve looking up an issuer of the authorization information 108, such as the identity of a certificate authority, in a data store containing records that specify trusted issuers, may include verifying that the authorization information 108 is valid and unexpired, and may include verifying whether a signature signed using a private key associated with the authorization information 108 is valid. In some cases, the authorization information 108 may only be valid for a limited amount of time (e.g., 30 seconds, four hours, eight weeks, one year, etc.). Additionally or alternatively, in some cases, the authorization information 108 may be good for a certain number of uses (e.g., one use, ten uses, ten thousand uses, etc.) and the proxy 106 or authorization service may track how many times the authorization information 108 has been used or how many uses the authorization information 108 has left in order to determine whether access may be granted to the client 102A using the authorization information 108.

It is contemplated that the present disclosure may be utilized with any of a variety of protocols, including Internet Protocol version 4 (IPv4), Internet Protocol version 6 (IPv6), Transmission Control Protocol (TCP), User Datagram Protocol (UDP), HTTP, Transport Layer Security (TLS), Secure Sockets Layer (SSL), Internet Message Access Protocol (IMAP), Post Office Protocol (POP), Simple Mail Transfer Protocol (SMTP), Secure Shell (SSH), Telnet, File Transfer Protocol (FTP), Simple Network Management Protocol (SNP), Domain Name System (DNS), Dynamic Host Configuration Protocol (DHCP), Network News Transfer Protocol (NNTP), and Network Time Protocol (NTP). Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adapatable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake.

In some embodiments, multiple protocols are used to establish a connection between the client 102A and the target 104. For example, to establish a MySQL connection with the target 104 on a specified port, the client 102A may initiate communication by passing the authorization information 108 during a Hypertext Transfer Protocol Secure (HTTPS) web request handshake using a using SSL or TLS protocol. The proxy 106 may intercept the authorization information 108 in the web request, and, upon validation of the authorization information 108, may provide the client 102A with an indication that the communication request has been accepted (e.g., with HTTP status code "200 OK" response, etc.). Note, in some implementations, the authorization information 108 is provided to the proxy 106 after an initial secure protocol (e.g., TLS, SSL, etc.) handshake and may be a same or different authorization information than provided during the initial handshake. For example, the authorization information provided by the client 102A in an initial TLS handshake may be a long-duration digital certificate, whereas the authorization information 108 provided after the initial handshake may be a short-duration digital certificate. Further description of long-duration digital certificates and short-duration digital certificates is described in U.S. patent application Ser. No. 14/570,867, entitled "SHORT-DURATION DIGITAL CERTIFICATE ISSUANCE BASED ON LONG-DURATION DIGITAL CERTIFICATE VALIDATION," incorporated by reference in the present disclosure. Thereafter, the client 102A may switch to use a different protocol for the MySQL connection with the target 104 on the specified port. In this way, public key infrastructure (PKI) may be utilized to validate a connection even if a particular application, such as MySQL, does not support PKI. Alternatively, in some implementations, the protocol is not switched; for example, the particular application may continue to communicate with the target 104 via the SSL or TLS connection established between the client 102A and the proxy 106.

In some implementations, a wrapper function is implemented on the client 102A to make the initial connection with the client and, after receiving acknowledgement (e.g., HTTP "200 Ok" response, etc.) from the proxy 106 that the authorization information 108 and client 102A have been validated, the wrapper function may launch or return control to the application (e.g., MySQL) on the client 102A attempting to communicate with the target 104. The wrapper function may be provided to the client by a computing resource service provider hosting the proxy 106. In this manner, the application on the client 102A may not need native support for public key infrastructure and up-to-date (e.g., not obsolete) certificate types.

Figure 2:
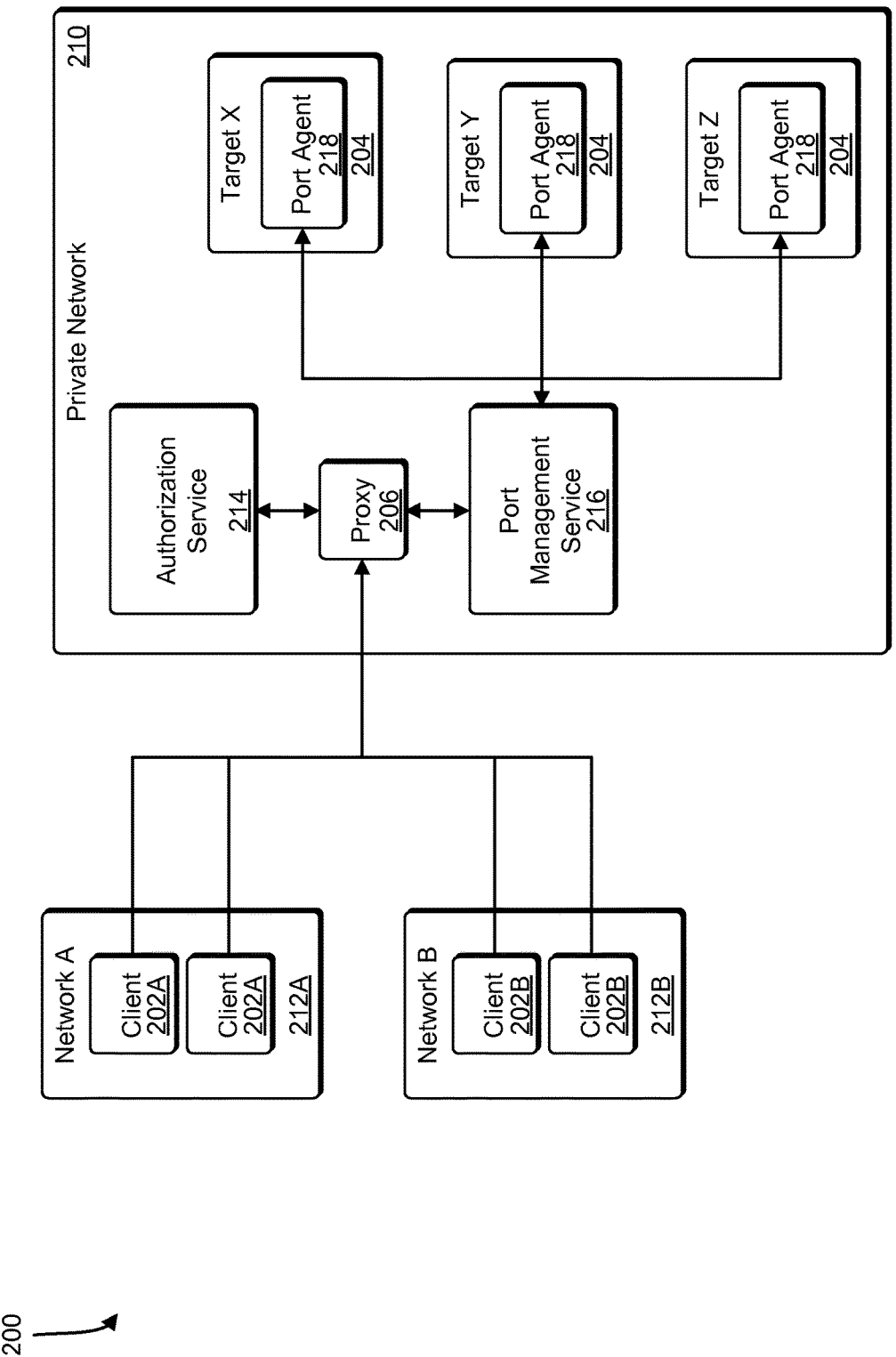
FIG. 2 illustrates an example of clients communicating with target computing systems in accordance with an embodiment.

FIG. 2 illustrates an aspect of an environment 200 in which an embodiment may be practiced. As illustrated in FIG. 2, the environment 200 may include clients 202A_02B from various networks 212A-12B attempting to access resources, such as target computing systems 204. Such access requests from the clients 202A_02B may be intercepted by a proxy 206, which may communicated with an authorization service 214 to determine whether certificates provided with the request are valid. Upon making this determination, the proxy 206 may communicate with a port management service, which in turn may communicate with port agents 218.

As noted, the clients 202A_02B may be any of a variety of computing devices, such as those described in conjunction with the clients 102A-02B of FIG. 1 or devices like the electronic client device 902 described in conjunction with FIG. 9. The target computing systems 204 may be any devices configured to communicate with devices such as the clients 202A_02B through a specified port, such as the target 104 of FIG. 1. In some examples in the present disclosure, a target computing system may be referred to as a "destination" computing system or device or as a server. Examples of such target computing systems include both virtual and non-virtual data servers, application servers, and web servers, and such servers as the application server 908 and the web server 906 of FIG. 9.

As noted, the proxy 206 may be a hardware device or an application implemented on a computing device. The proxy 206 may be configured to act as an intermediary between the clients 202A_02B and the target computing systems 204 in the private network 210. The proxy 206 may be configured to receive or intercept any packets inbound to the private network 210 or any incoming connections to the proxy 206 or the target computing systems 204. The private network 210 may utilize one or more proxies like the proxy 206 in parallel for redundancy or load-balancing purposes. In some embodiments, the proxy 206 intercepts communications from the clients 202A_02B to the target computing systems 204, whereas in other embodiments, the clients 202A_02B communicate directly to the proxy 206 with its requests. In some embodiments, the private network 210 has multiple proxies like the proxy 206, such as for failover redundancy and/or performance purposes. In some implementations, the proxy 206 has one or more digital certificates of its own that it may provide with its communications to the authorization service 214, port management service 216, or other services or devices so that such services may confirm the identity of the proxy 206 attempting to communicate with them.

The private network 210 may be a network of virtual and/or non-virtual computing devices, such as the target computing systems 204, and the private network 201 may be isolated from outside networks except for communications through an interface, such as the proxy 206. In other words, the proxy 206 may selectively regulate access to the target computing systems 204 by devices outside the private network 210, such as the clients 202A_02B. The networks 212 may be any of various types of computer networks external to the private network 210, such as local area networks, wide area networks, Wi-Fi networks, and the Internet. The networks 212 may be configured such that they can request to initiate communications at least with the proxy 206.

The authorization service 214 may be a service that utilizes one or more computing devices to authenticate digital certificates. Note that in some embodiments, the functionality of the authorization service 214 are integrated with the proxy 206. When the proxy 206 receives a request containing a certificate, such as the certificate 108 of FIG. 1, the proxy 206 may forward the certificate to the authorization service 214 to be authenticated. The authorization service 214 may respond to the proxy 206 with one or more possible response, including that the certificate is invalid, that the certificate is expired, that the certificate is valid but that the issuing certificate authority is unknown or untrusted, or that the certificate is valid and the issuing certificate authority is trusted.

The port management service 216 may be a service configured to act as an intermediary between the proxy 206 and the port agents 218. For example, upon confirmation that a digital certificate of a client is valid and that the issuing certificate authority is trusted, the proxy 206 may make a request to the port management service 216 to cause the requested port of the specified target computing system to be opened. As a result of receiving this request from the proxy, the port management service 216 may determine which port agent corresponds to the specified target computing system and may make a request to the port agent running on the specified target computing system to open the requested port on the specified target computing system. Note it is contemplated as within the scope of this disclosure that the techniques applied in the present disclosure for enabling communication between a client device and the target computing system may also be performed in a variety of ways other than designating that a specified port or port range may be opened for a specific client. For example, in some implementations, the specific client (e.g., identified by internet protocol address or other identifier) may be added to a list of approved devices to communicate to the target at the specified port or port range. As another example, once authorized, the client device may be inducted as a member of (i.e., allowed to join) the private network 210 for at least a limited amount of time, thereby allowing the client device to communicate with the target computing systems 204 within the private network 210. Thus, communication may be established between client devices 202A-02B and the target computing devices 204 not only by opening specified ports in a firewall and enabling a pass through mode, but using other techniques as well. Based on a response (e.g., success, failure, etc.) from the port agent, the port management service 216 may respond to the proxy 206 that the requested port was opened (or not) on the specified target computing system for communications from the requesting client.

The port agents 218 may be software applications executing in the respective operating system of the target computing systems 204 configured to open/enable ports on the target computing systems 204 upon request by the port management service 216. In some implementations, the port agents 218 can be configured to close opened ports after a predetermined amount of time, whereupon if a client wishes to communicate with the target computing system 204 on the specified port, the client may need to re-submit a valid certificate to the proxy 206. In some implementations, the functionality of the port agents 218 is implemented in hardware, such as in a top-of-rack switch, daughtercard, or dongle. In some of these implementations, the daughtercard or dongle may be located in a same or different physical host as the target computing systems 204, such as in an intermediary computing system or other device, and may be configured to provide the functionality of opening and closing ports for the target computing systems 204. When a port agent receives a request from the port management service 216 to open a port on its target computing system, the port agent may open the requested port and respond to the port management service 216 whether the port was successfully opened. Upon receiving an indication that the port has been opened, the port management service 216 may communicate this successful opening to the proxy 206. Note that port agents may not be necessary in all embodiments. For example, in some embodiments where the target computing systems 204 are virtual machine instances having a virtual networking layer controlling which packets are allowed to pass to the virtual machine instance or not, the port management service 216 instead hooks into the virtual networking layer to cause the ports for the specified target computing system to be opened or closed. In such embodiments, the port management service 216 assumes some of the functionality ascribed to the port agents 218 in the preset disclosure.

In some embodiments, the port agents 218 are configured to close/block opened ports after a predetermined time limit (e.g., 60 minute timeout, close ports after 5:00 PM eastern standard time, etc.) or after a threshold amount of inactivity (e.g., an idle timeout of five minutes of inactivity). In these embodiments, the clients 202A_02B may need to re-supply valid certificates for the port agents 218 to reopen the specified port(s). In some embodiments, the port agents 218 are configured to close/block a port after a threshold number (e.g., a million) of packets have been passed to or from the respective target computing system. In other embodiments, the port agents 218 are configured to open some or all individual ports only to a limited number of clients 202A_02B. For example, port 1234 may be opened on a target computing system by a port agent for a particular client in a manner according to the present disclosure. As long as the port is actively being used by the particular client (e.g., no inactivity timeout has occurred), the port agent may be configured to not open port 1234 for any other client, or may be configured to only open the port for only a limited number (e.g., five) of clients 202A_02B actively using the port at a time.

With this notice, the proxy 206 may relay this success in a message to the requesting client (e.g., with a Hypertext Transfer Protocol (HTTP) status code "200 OK," etc.), and enable a pass-through mode for the client for communicating with the target computing system on the specified port. With the pass-through mode enabled, the proxy 206 may forward future communications from the client to the target computing system at the specified port without requiring the client to provide a certificate each time. Note that in some implementations, rather than implementing a pass-through mode on the proxy 206, the proxy 206 communicates to a network management layer or virtual networking layer of the private network 210 that the client has been validated, such as by storing a pass-through mode status of 'enabled' in association with an Internet Protocol address of the validated client in a data store accessible to the network management layer or virtual networking layer. The network management layer may subsequently reconfigure the private network 210 such that, for as long as the pass-through mode is enabled, future communications from the validated client to the target computing system need not pass through the proxy 206, but instead may be routed directly to the target computing system. As one example, routing tables of routers of the private network 210 may initially be configured to route incoming data to the proxy 206 rather than to the target computing systems 204, and the private network 210 can be reconfigured by updating the routing tables to route data coming from the validated client to the specified target computing system, thereby bypassing the proxy for that data. In some examples, the network management layer or virtual networking layer may refer to a service, application, or other computing structure that controls which packets are allowed to pass to which machines within a network managed by the network management layer or virtual networking layer.

In some implementations, the proxy 206 logs the client request and its certificate in a data store, which may be retrieved at a later date for auditing purposes or for quick reference for re-validating the client in the future. In some of these implementations, the proxy 206 allows the client to connect to other target computing systems 204 and/or other ports (e.g., by requesting from the port management service that the ports on the requested target computing systems be opened) without the client being required to re-supply a valid certificate. Note that upon expiration of the certificate, the requesting client may need to re-supply a valid certificate, regardless. In some implementations, such pass-through mode expires (i.e., is disabled) after a predetermined time, whereupon the client may need to re-supply a valid certificate to re-establish communication with the target computing system at the specified port.

Figure 3:
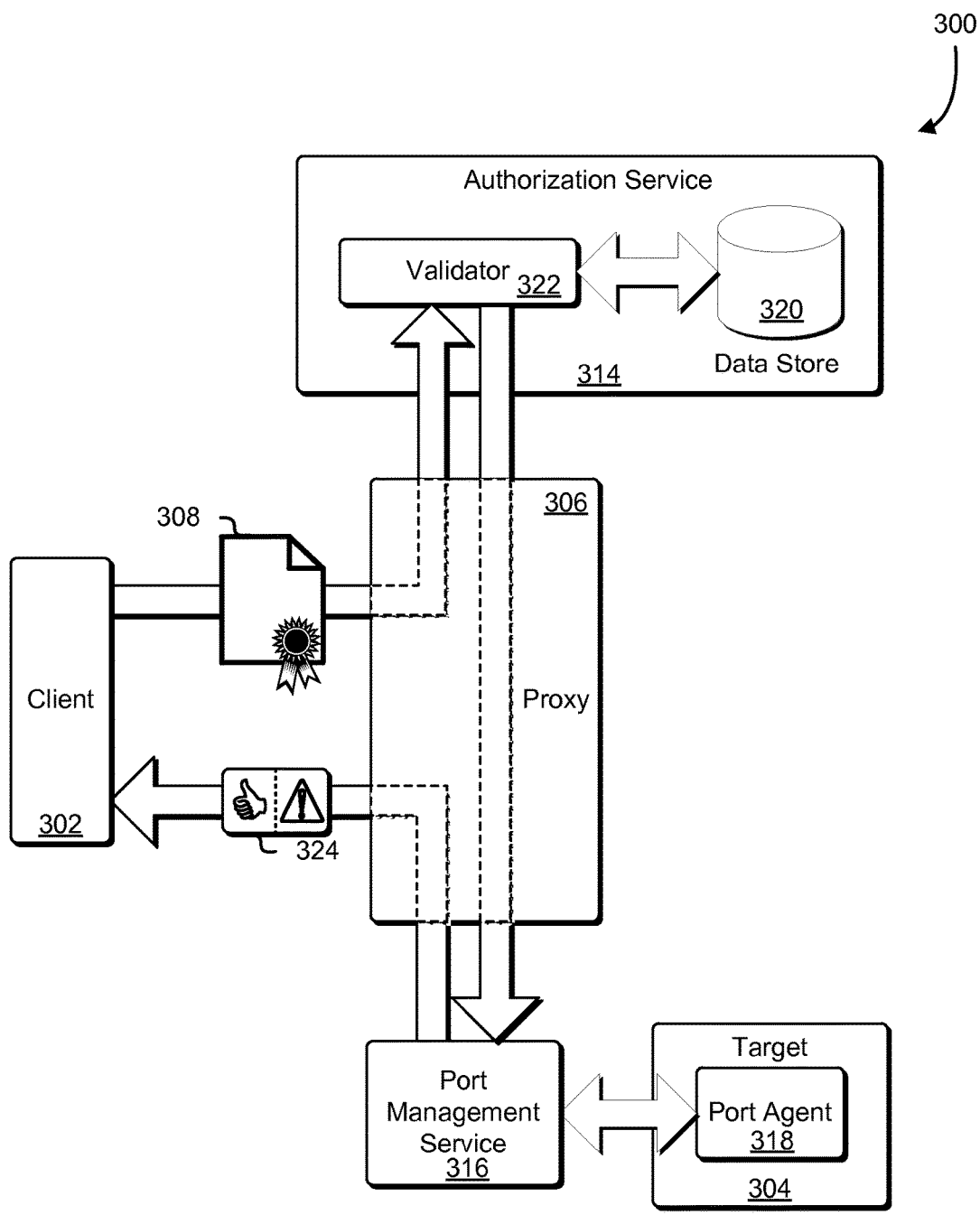
FIG. 3 illustrates an example of the way of establishing connection to a port of a target in accordance with an embodiment.

FIG. 3 illustrates an aspect of an environment 300 depicting a flow of communication of an embodiment triggered by an initial request to access a resource in the environment 300. As illustrated in FIG. 3, the environment 300 includes a client 302 that makes a request to access a specified port on a target 304, the request including a certificate 308 issued to the client 302 from a certificate authority. The request may be intercepted by the proxy 306, which may pass the certificate to a validator 322 of an authorization service 314 to be validated against data in a data store 320 of the authorization service. Upon successful validation, the proxy 306 may make a request to open the specified port to a port management service 316. The port management service, subsequently, may communicate with a port agent 318 on the target to open the specified port. The port agent 318 may determine to open the port and attempt to open the port, and may pass the result (e.g., successful, failed, etc.) to the proxy 306, whereupon the proxy 306 may provide an indication 324 to the client 302 whether the request has been fulfilled or not.

As noted, the client 302 may be any computing device, virtual or non-virtual, capable of communicating through a network to a specified port of a target computing system, such as the target 304.

Also as noted, the target 304 may a computing device, virtual or non-virtual, capable of responding to communications from the client 302 through the specified port.

The proxy 306 may be implemented in hardware, such as in a top-of-rack switch, daughtercard, host computing system dedicated to act as a proxy for the particular network, or dongle communicatively attached to a host computing system, or may be implemented in software on a computing system, such as a service provided by a computing resource service provider or as software executing in a controlling or privileged domain of a hypervisor in the particular network. The proxy 306 may be configured to act as an intermediary between the client 302 and the target 304.

The certificate 308 may be a digital certificate, also known as a public key certificate, issued by a certificate authority. That is, the certificate 308 may be an electronic document usable to prove that the client 302 is the owner of a public key. In a public-key infrastructure (PKI) implementation, the certificate 308 can include a signature from the issuing certificate authority which may be verified by the authorization service 314 as whether the certificate authority is on a list of trusted authorities in the data store 320 (i.e., specified as trusted). In a web-of-trust implementation, the certificate 308 can also be signed by the client 302 and considered trustworthy upon validation of the signature (presuming that the proxy 306 and/or authorization service 314 trusts the client 302). In some embodiments, the certificate 308 or request from the client 302 includes an address (such as an Internet Protocol address) of the client 302, which may also be digitally signed by the client 302.

As noted, upon receipt of the certificate 308, the proxy 306 may forward the certificate to the authorization service 314 for validation. The authorization service 314 may be configured to validate certificates provided to it by the proxy 306. Note that the authorization service 314 may support more than one similar proxy to the proxy 306 and may reside on a different network than the network of the target 304 and/or proxy 306. Furthermore, there may be more than one authorization service 314 within the environment 300 (e.g., for redundancy and/or performance purposes). Functionally, the authorization service may be divided into components for validating certificates (the validator 322) and stored data (the data store 320). The validator 322 may be configured to receive and validate the certificate 308. For example, the validator 322 may check that the certificate 308 is in the proper format for a digital certificate, contains a public key for an asymmetrical key scheme, and that the certificate 308 has not expired. The validator 322 may also check the data store 320 to determine whether the certificate 308 was issued by a certificate authority listed as being trusted by the authorization service 314, and may verify that the digital signature in the certificate 308 is from the certificate authority.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In some embodiments, the network of the target 304 is a physical or virtual network of a customer of a computing resource service provider. In such embodiments, the authorization service 314 may be a service provided by the computing resource service provider to its customers, such that the customer owner of the physical or virtual network may specify, such as through an application programming interface or other user interface, to the authorization service 314, which certificate authorities are trusted (or not). The authorization service 314 may store such customer-specified information in the data store 320 where it may be used by the authorization service 314 for determining whether certificate authorities are trusted by the target 304. Such authorization service may be further configurable by the customer to specify whether certain digital certificates and signatures signed with keys associated with certain digital certificates are considered valid, and specify whether certificates from certain entities are considered valid.

If the signature could not be verified or if the certificate authority could not be found in the list of trusted authorities in the data store 320, then the validator 322 may indicate to the proxy 306 that the certificate 308 cannot be trusted. In such a case, the proxy 306 may consequently deny the client 302 request to connect to a port of the target 304. In some of these cases, the proxy 306 may respond to the client 302 with an error (e.g., HTTP status code "401 unauthorized," etc.), whereas in others of these cases the proxy 306 may not respond to the client 302 (i.e., may react by taking no action other than ignoring the client 302 request). The certificate 308 may also include the public key of a public-private key pair, and, in some cases, the request may be digitally signed using the private key of the key pair. The validator 322 may determine that the client 302 is to be trusted—or at least has the private key corresponding to the public key in the certificate 308—by validating the signed request using the public key from the certificate 308. The data store 320 may be a database, file, or other data storage entity configured to store a list of trusted certificate authorities. In some cases, the data store 320 may also store a list of trusted certificates and/or associated public keys. In some cases, the data store 320 may log information about each time it is requested to validate a certificate for auditing and other purposes; for example, an Internet Protocol address of the client 302, a timestamp reflecting the time of the request, and/or a copy of the certificate 308 may be logged. Note that in some implementations, the functionality of the authorization service 314 are built into the proxy 306, and in such implementations, the proxy 306 may perform those functions itself.

The port management service 316 may an application executing on one or more computing devices within the network of the target 304 and/or the proxy 306. In some cases, the port management service 316 may reside on one or more computing devices outside the network of the target 304 and/or the proxy 306. Furthermore, there may be multiple port management services, for example, for redundancy fallback and/or parallelism. The port management service 316 may be configured to communicate with the port agent 318 on the target 304. The communications between the port management service 316 and the port agent 318 may include requests to open a specific port or range of ports on the target 304 and requests to close a specific port or range of ports on the target 304. As depicted in FIG. 2, for example, the port management service 316 may be configured to manage one or more targets. The port management service 316 may also be configured to receive communications from the port agent 318, such as statuses of one or more ports (e.g., open, closed, unavailable, reserved, etc.), whether a port open or close request was granted and successful, or whether a port open or close request was denied or unsuccessful.

Upon notification from the validator 322 that the certificate 308 of the client 302 is valid and trusted, the proxy 306 may request, through the port management service 316, that the specified port on the target 304 be opened for the client 302. The port management service 316 may then request that the corresponding port agent 318 open the specified port on the target 304. Note that it some implementations, the functionality of either or both the port management service 316 and the authorization service 314 are integrated into the proxy 306 itself. Note too that in some implementations, the functionality of one or more of the proxy 306, the authorization service 314, or port management service 316 are implemented in hardware or software of the same physical machine that hosts the target 304. For example, the proxy 306, the authorization service 314, or port management service 316 may be one or more processes executing in a controlling domain of a virtualization layer, like a hypervisor, and the target 304 may be a virtual machine instance of a set of virtual machine instances running on the machine. Note too that in such implementation, the port agent 318 may not be running within an environment of the target 318, but may be a process running under the virtualization layer, such as in the controlling domain. In other implementations, the port agent 318 is an application running on the target 304, for example, executing as a background process of an operating system of the target 304, and configured to receive requests from the port management service 316 and respond to requests of the port management service 316. The port agent 318 may also be configured to provide port status updates and keepalive messages to the port management service 316. The target 304 may have a firewall, implemented in software executing on the target 304 on an intermediary device, configured to block network traffic to unopened ports of the target 304. Upon receiving a request from the port management service 316 to open a specified port (or port range) on the target 304, the port agent 318 may attempt to update the firewall configuration to allow (or no longer block) the specified port of the target 304. The port agent 318 may then communicate to the port management service 316 whether the port agent 318 was able to successfully open the specified port. In some implementations, the firewall is located on an intermediary computing system networked between the client 302 and the target 304, such as the proxy 306 or some other intermediary computing system, and causing the specified port to be opened or closed in the firewall allows data to be communicated from the client 302 to the target 304 or blocks data from the client 302 from being communicated to the target 304 respectively. In such implementations, the port agent 318 may not exist on the target 304, but rather may exist on the intermediary computing system or the environment 300 may not contain the port agent 318 as such at all.

The port management service 316 may then relay to the proxy 306 whether the port agent 318 successfully opened the specified port on the target 304, and in turn the proxy 306 may provide the indication 324 to the client 302 whether the port was successfully opened as requested. In some cases, the indication 324 may be a message of success (e.g., a HTTP status code "200 OK, etc."), or, in the event of failure, a failure message (e.g., HTTP status code "401 Unauthorized," "403 Forbidden," "500 Internal Server Error," etc.). Note that in some embodiments, no indication of success and/or failure may be provided to the client 302 in this manner. For example, upon failure to open a port, the client 302 may receive no response and the request may time out. Likewise, upon success, the client 302 may establish communication with the target 304 without receiving a separate indication of success. In a similar manner, if authorization to communicate with the target 304 expires (e.g., due to the certificate 308 expiration date or other time limit), attempts to communicate with the target 304 may time out without any other indication of failure. The client 302 may respond to such timeouts by again submitting a valid certificate 308 or other authorization information.

In some embodiments, the port on which the client 302 attempts to establish communication is not the same port that is opened for the client 302. That is, the client 302 may initiate communication on a specified port (e.g., port 3306, port 443, etc.), and, once the proxy 306 validates the certificate 308, the proxy 306 or the port management service 316 may request that the port agent 318 open a different port (e.g., determined randomly from a set of possible ports) on the target 304. Once the different port is opened, the proxy 306 may communicate to the client 302, in the indication 324, which port has been opened for the client 302, and the client 302 may switch its communications with the target 304 to use the different port. In this manner, network security may be increased because the port eventually used for the communications may not be determinable ahead of time by entities outside the network. In a similar manner, the proxy 306 and/or port management service 316 may be configured to select a different target for the client 302 than the target 304 requested by the client 302. Note also that in some embodiments the certificate validation is to be performed port-by-port; that is, as long as the client provides a valid certificate, the proxy 306 and other components of the environment 300 may allow the client 302 to connect to any valid requested port of the target 304.

Communication between the client 302 and the target 304 may be enabled by the proxy 306 with a limit on the communications. That is, in some embodiments, after the proxy 306 has determined that the client 302 can be trusted (e.g., through validation of a certificate provided by the client) and can be allowed to communicate with the target 304 on a particular port, the proxy 306 determines to allow such communication only for a predetermined time limit (e.g., timeout after four hours, timeout after thirty days, timeout after two minutes, every Monday at midnight Eastern Time, etc.) or for a predetermined number of requests (e.g., 10,000 requests, etc.). The proxy 306 may enforce the limit in a number of ways, including setting a pass-through mode corresponding to the client 302 and the particular port of the target 304 that is configured to expire at a certain date/time, after a certain amount of time has passed, or after a specified number of requests have been made by the client 302 for the port of the target 304. For the duration of the pass-through mode, communications from the client 302 for the particular port of the target 304 may be forwarded to the particular port of the target 304. However, upon reaching the limit of the pass-through mode, the pass-through mode may be disabled for communications from the client 302 to the particular port of the target 304 until the client 302 again supplies a valid certificate. As noted in the present disclosure, in some implementations, the limit can correspond to and/or be enforced by an expiration date on the certificate 308.

Figure 4:
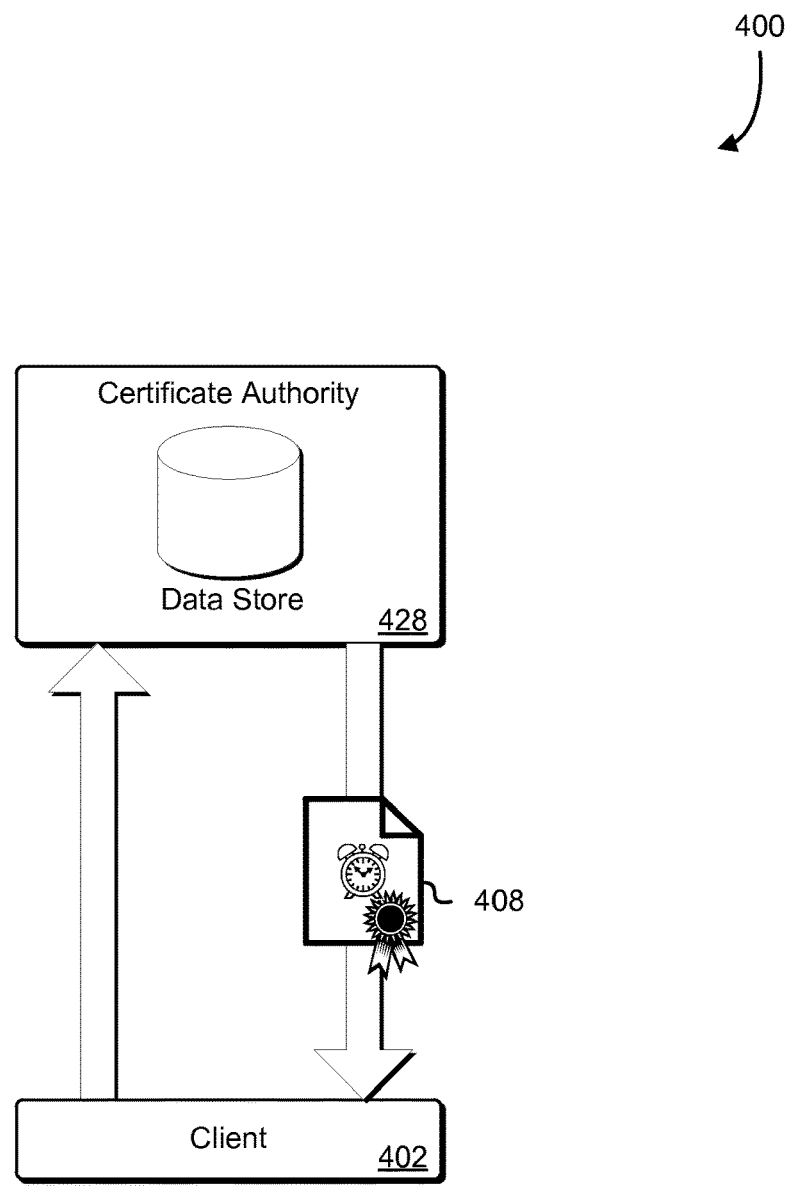
FIG. 4 illustrates an example of obtaining a short-duration digital certificate in accordance with an embodiment.

FIG. 4 illustrates an example embodiment 400 of the present disclosure/etc. Specifically, FIG. 4 depicts a client 402 that requests, and obtains, a short-duration digital certificate 408 from a certificate authority 428, similar to the short-duration digital certificates described in U.S. patent application Ser. No. 14/570,867, entitled "SHORT-DURATION DIGITAL CERTIFICATE ISSUANCE BASED ON LONG-DURATION DIGITAL CERTIFICATE VALIDATION," incorporated by reference in the present disclosure. For example, the client 402 may have already obtained a long-duration digital certificate from the certificate authority 428, and may, for the purpose of providing a valid certificate to a proxy of the present disclosure in order to establish connection to a port of a target computing system, obtain one or more short duration digital certificates from the certificate authority 428. The short-duration digital certificate 408 may only be valid for a short period of time (e.g., one day, one week, two hours, etc.), and once expired, the client 402 may be required to provide a different, unexpired short-duration digital certificate in order to be permitted by a proxy to connect to the port of the target computing system.

In an embodiment, the client 402 obtains a long-duration digital certificate from the certificate authority 428, and keeps the digital certificate in a hardware-secured execution environment of the computing system, such as a Trusted Platform Module (TPM) or an enclave provided by hardware supporting Intel® Software Guard eXtensions (SGX), except when providing the digital certificate to a proxy in an access request as described in the present disclosure. In another embodiment, the client 402 obtains one or more short-duration digital certificates, and may provide one of these short-duration digital certificates in the access request as described in the present disclosure.

Figure 5:
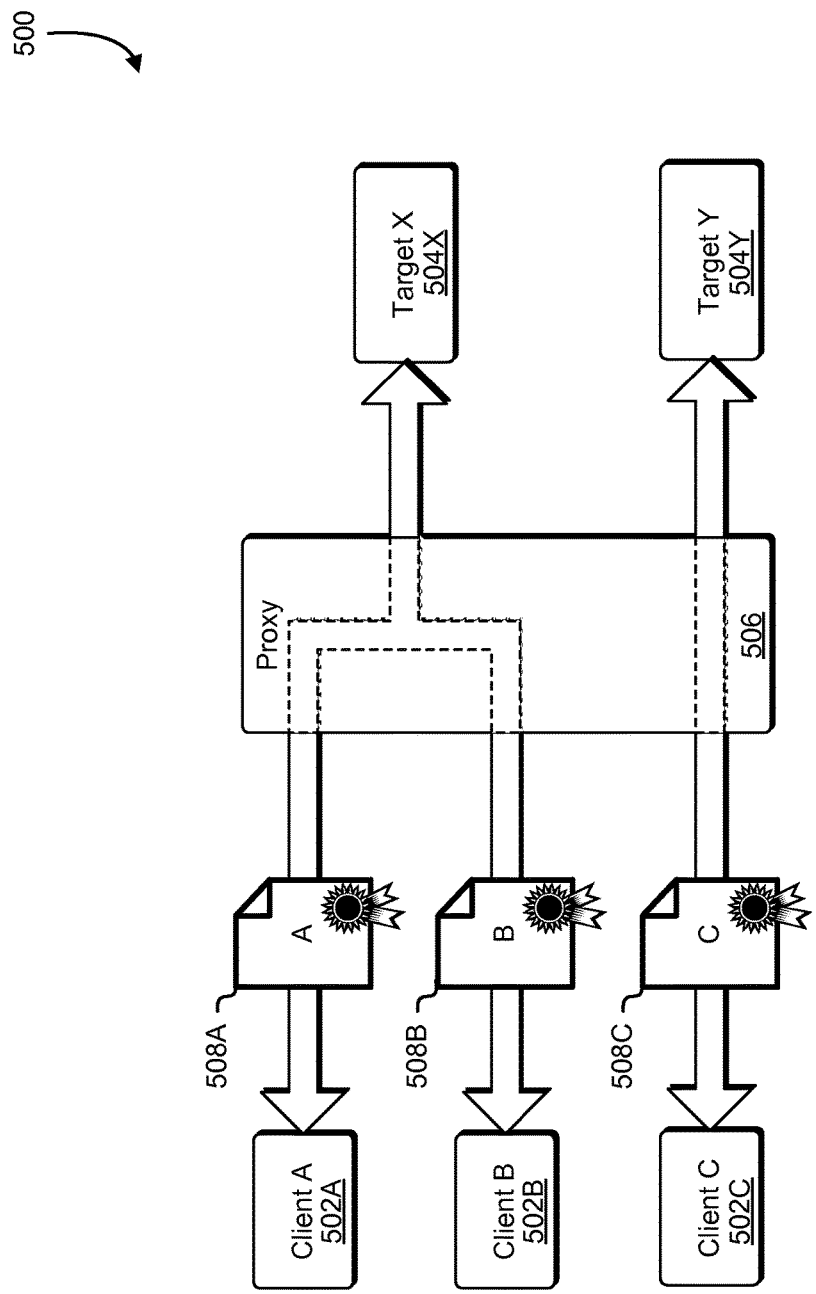
FIG. 5 illustrates an example of multiple clients connecting to multiple servers in accordance with an embodiment.

FIG. 5 illustrates an aspect of an environment 500 in which an embodiment may be practiced. Specifically, FIG. 5 depicts clients 502A-02C attempting to connect to ports of targets 504 by passing authorization information 508A-08C to a proxy 506 in accordance with the present disclosure. In the environment 500, client A 502A and 502B both attempt to establish a connection to a port or ports of target X 504X. In doing so, each of the clients 502A-02B pass respective authorization information 508A-08B to the proxy 506, where each of the respective authorization information 508A-08B were digital certificates issued to client A 502A and client B 502B respectively by a certificate authority. For example, the authorization information 508A may provide at least some attestation as to the identity of the client A 502A, and may include a public key of a public-private key pair, where the private key of the key pair is held by client A 502A. In this example, the authorization information 508A may accompany a digital signature of client A 502A signed with the private key. Likewise, the authorization information 508B may provide at least some attestation as to the identity of the client B 502B and may carry a public key of a public-private key pair, where the private key of the key pair is held by client B 502B, and the authorization information 508B may accompany a digital signature of client B 502B signed with the private key.

Once the respective authorization information 508A-08B is validated by the proxy 506, the proxy 506 may cause the requested ports on the target X 504X to be opened for the clients A and B 502A-02B. Note that while the clients A and B 502A-02B may appear to be acting in parallel in FIG. 5, the illustration is intended to illustrate that the proxy 506 can manage multiple requests for communications to the same or different targets, and not meant to imply that such communications necessarily occur in parallel or are validated in parallel. Similarly, the client C 502C may attempt to establish a connection to a port of a different target served by the proxy 506, target Y 504Y. In doing so, the client C 502C may pass its authorization information 508C to the proxy 506, where the authorization information 508C was a digital certificate issued to the client C 502C by a certificate authority. Once the authorization information 508C is validated by the proxy 506, the proxy 506 may cause the requested port on the target Y 504Y to be opened for the client C 502C.

Figure 6:
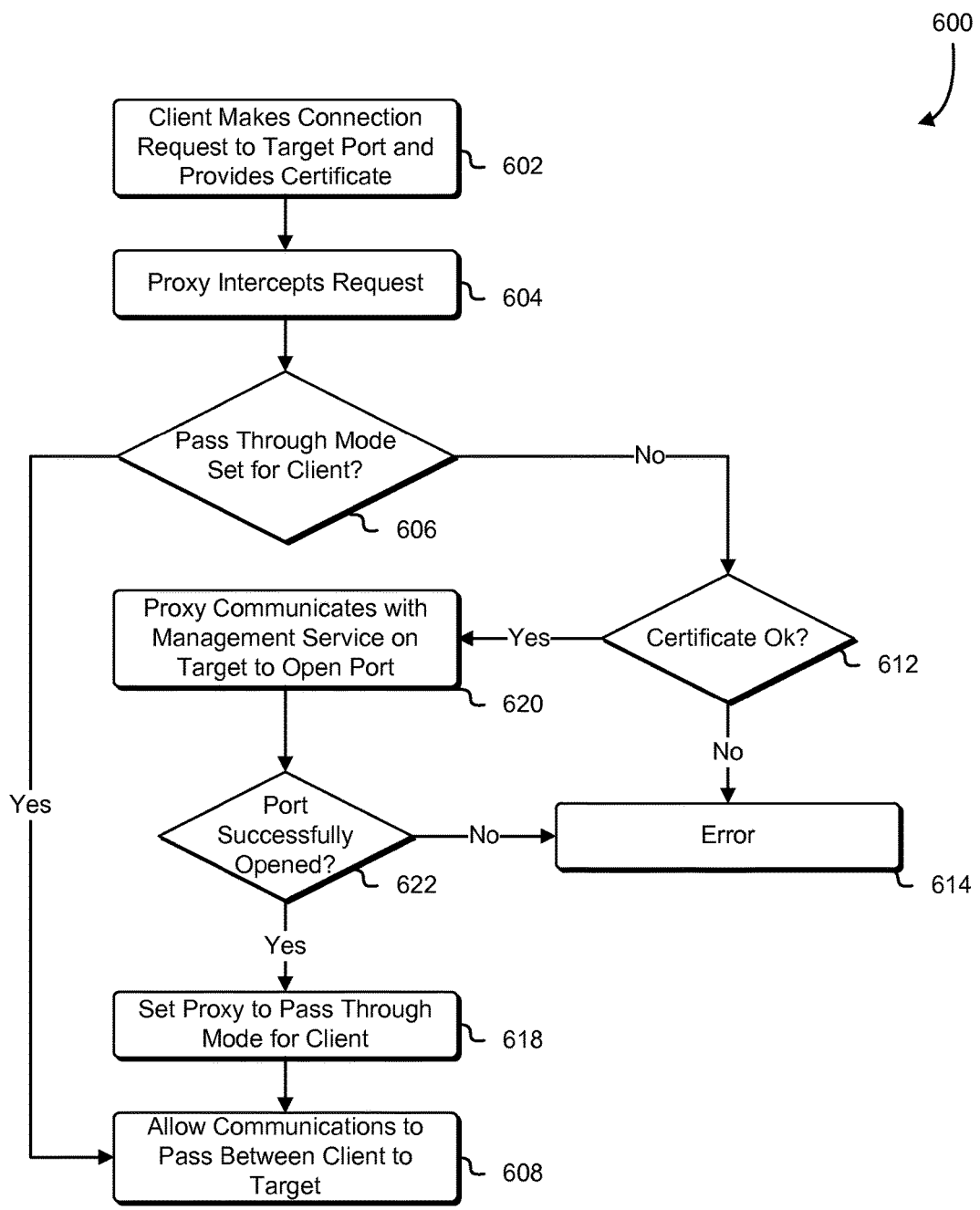
FIG. 6 is a flow chart that illustrates an example of a client connecting to a port of a target in accordance with an embodiment.

FIG. 6 is a flow chart illustrating an example of a process 600 for a client connecting to a target (e.g., physical or virtual computing system) in accordance with various embodiments. The process 600 may be performed by any suitable system such as a server in a data center, multiple computing devices in a distributed system of a computing resource service provider, or any electronic client device such as the electronic client device 902 described in conjunction with FIG. 9. The process 600 includes a series of operations wherein a client makes a request addressed to a port of a target, the request is intercepted by a proxy, a determination is made whether the client is trusted to connect to the target, and, if trusted, a port is opened on the target for the client.

In 602, a client makes a request directed to a target to connect to a port of the target. The client may be a virtual or physical machine in a separate network from the network of the target. In 604, a proxy intercepts the request addressed to the target made by the client before it reaches the target. The proxy may be implemented in hardware or software; for example, the proxy may be integrated with a top-of-rack switch or a dongle device attached to a computing device of the network of the target. The proxy may be configured to act as an intermediary device, such that communications between devices outside the network and machines inside the network must pass through the proxy. Note that in some cases there may be multiple proxies operating in parallel for the network. Additionally or alternatively, in some cases a proxy may serve multiple networks of targets.

In 606, the system performing the process 600 makes a determination whether a pass-through mode has been set. In some examples, a "pass-through mode" may refer to a state of the proxy whereby communications between the client and the target, on the specified port, may be forwarded to the target without requiring the client to supply a certificate for verifying the client's identity. The pass-through mode may be set after the proxy has already verified that the client is trustworthy. In some embodiments, the pass-through mode state, additionally or alternatively, is stored in a data store in association with (e.g., linked to) the client; in this manner, the pass-through mode state of the client may be determined with reference to the data store if a different proxy handles a subsequent request by the client or if the initial proxy does not have the pass-through mode state for the client stored within its memory.

Note that in some cases, setting the pass-through mode in this context does not preclude the proxy from performing other checks on the communications between the client and the target, such as packet sniffing for denial of service attack detection and virus detection. In some implementations, pass-through mode is only client-specific; that is, once the client's certificate has been validated, the client may make requests to different ports and/or different targets without having to supply its certificate again. In some implementations, such packet sniffing and/or other security checks is performed by a proxy or system other than the system performing the process 600, and the system may forward to or be forwarded the client packets from the other proxy or system.

In other implementations, the pass-through mode is client-target specific (or client-port specific); that is, once the client's certificate has been validated, as long as the client does not request to connect to a different target (or different port), the client may not be required to resupply its certificate. In still other implementations, the pass-through mode is client-target-port specific; that is, the client may be required to supply a valid certificate any time it makes a request to connect to a different port or target than the port and target connection already approved. In some implementations, instead of identifying client devices machines by Internet Protocol addresses, the validated certificate can be utilized to identify the client devices machines sending data with the certificate and/or signing data with a private key associated with the certificate.

If pass-through mode has been set for the client, the system performing the process 600 may proceed to 608, whereupon the client may be allowed to communicate with the target on the specified port. Otherwise, if pass-through mode has not been set for the client, the system performing the process 600 may proceed to 612, whereupon the system performing the process 600 may perform a set of validation operations to validate the provided certificate. Note, in some implementations, the certificate is not provided in 602, but, rather, at or prior to 612, the proxy may make a request to the client to provide the certificate. In response, the client may provide the certificate at this point. The set of validation operations of 612 may include one or more of determining whether the certificate is valid (e.g., not expired, not corrupted, not modified, etc.), whether the certificate authority that issued the certificate is specified as trusted (e.g., in a data store of an authorization service), whether the client has authorization (e.g., with reference to a security policy) to access the target, whether the digital signature of the certificate authority is valid, or whether an accompanying digital signature of the client is valid. As noted, in some implementations, the set of validation operations are performed by the proxy, whereas in other implementations the set of validation operations are performed by an entity different than the proxy, such as an authorization service.

If the certificate is determined not to be acceptable, the system performing the process 600 may proceed to 614, whereupon the system may take an action reflecting the certificate confirmation or failure. In some cases, the proxy may return an error code and/or message to the requesting client. In other cases, the proxy may provide no error message and just ignore the requesting client until a valid digital certificate is provided. In some cases, the error may be logged in a data store.

Otherwise, if the certificate is validated, the system performing the process 600 may proceed to 620, whereupon the system may make a request to a port agent on the target to open the specified port for the client. The port agent may respond to the system whether the port was successfully opened or not. In some cases, the port may already be open. For example, the port may have been unblocked for the client at a previous time and the port may not have been closed yet, or, as another example, the port may have been opened for another requesting client. If the port is already opened for the client, the system performing the process 600 may proceed to 618 to enable pass-through mode for the client on the proxy. If the port has been opened for another client, the system may communicate with a proxy agent on the target to request that the client be allowed to communicate with the target on the specified port, and with acknowledgement of the request by the proxy agent, may proceed to 618 to enable pass-through mode for the client. In some embodiments, however, there may be a limit to the number of clients allowed to communicate with the target on the specified port, and, in the event that the limit has already been reached, the proxy agent may deny the request by the proxy to allow the client to communicate with the target on the specified port. In some implementations, the proxy selects an alternative target and communicates with a proxy agent on the alternative target to request access or to request to open a port for the client on the alternative target.

In 622, the system performing the process 600 may determine, based on a response from the proxy agent, whether the specified port was successfully opened. If the port agent was unable to open the specified port on the target and/or alternative target, the system performing the process may proceed to 614, whereupon the system may take an action reflecting the inability to open the port. In some cases, the proxy may return an error code and/or message to the requesting client. In some cases, the error may be logged in a data store. However, if the port is successfully opened for the client on the target, the system performing the process 600 may proceed to 618.

In 618, a pass-through mode for the client to the specified port on the target may be enabled. As noted, in some embodiments, the pass-through mode is implemented internal to the proxy. Additionally or alternatively, the pass-through mode status of "enabled" may be written to a data store accessible to other proxies (and the pass-through mode status may also be configured/stored to expire at a predetermined date or time) in association with the client. In some of these embodiments, the pass-through state is retrieved from the data store by other proxies and/or a network management layer for the network of the target such that the other proxies and/or network management layer are able to determine that the client has already been validated (e.g., per the pass-through state). Enabling the pass-through layer may allow future communications between the client and the target system (or the particular port of the target system) to bypass one or more operations of 604-718 for as long as the pass-through mode remains enabled. Thus, in 620, the client may be allowed to communicate with the target on the specified port.

In some embodiments, when the system performing the process 600 approves the client to connect to the target at the specified port, if the client does not subsequently communicate with the target within predetermined time period (e.g., ten seconds, 20 seconds, one minute, one hour, etc.), the system withdraws approval (e.g., turn pass-through mode off for the client) and require the client to re-submit a valid certificate. In these and some other embodiments, if communications between the client and/or target cease for a threshold time limit (e.g., an amount of time equal to or exceeding an idle timeout), the pass-through mode is disabled until the client resupplies a valid certificate to re-establish communications. Note that one or more of the operations performed in 602-22 may be performed in various orders and combinations, including in parallel.

Figure 7:
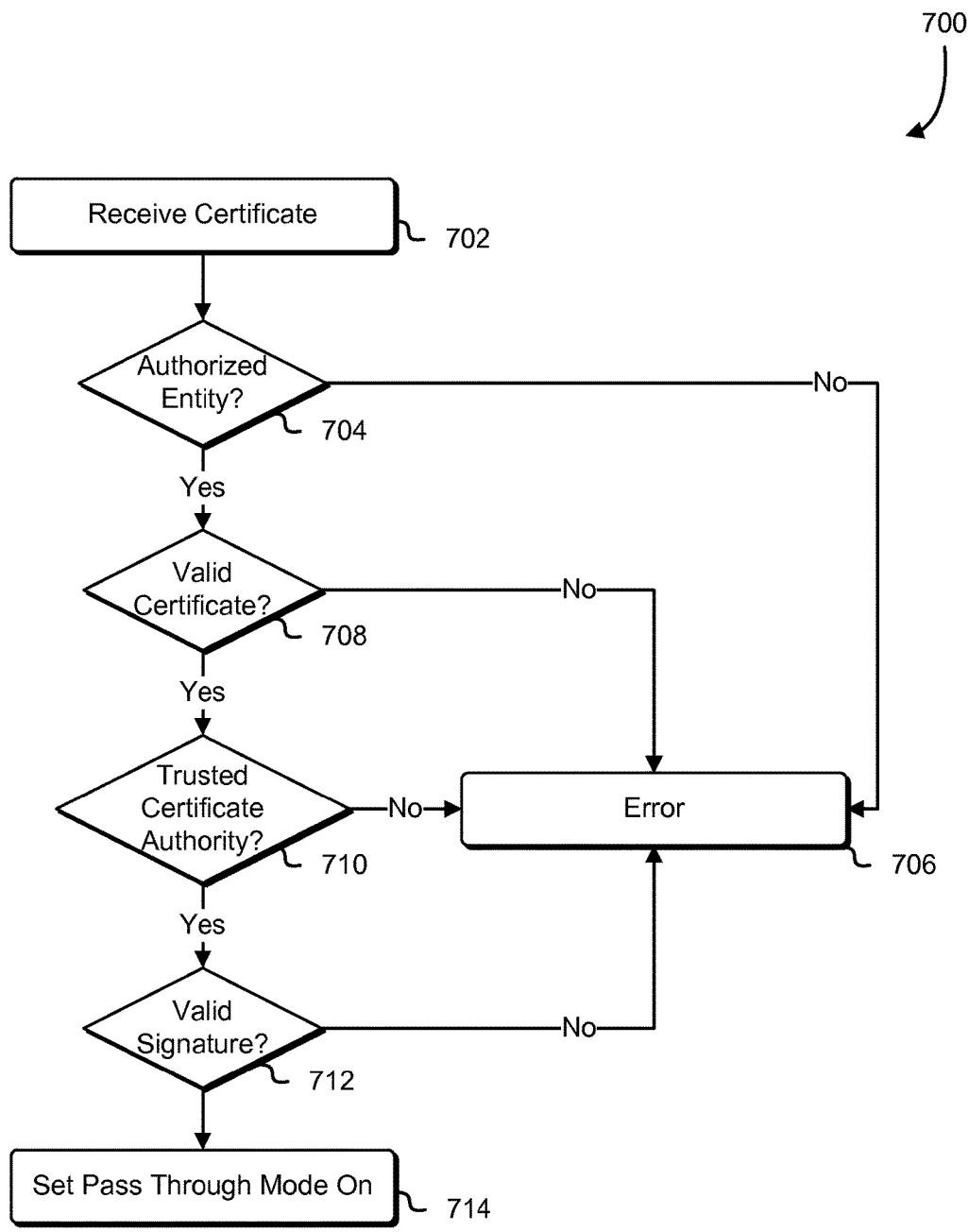
FIG. 7 is a flow chart that illustrates an example of validating a certificate in accordance with an embodiment.

FIG. 7 is a flow chart illustrating an example of a process 700 for validating a certificate in accordance with various embodiments. The process 700 may be performed by any suitable system such as a server in a data center, multiple computing devices in a distributed system of a computing resource service provider, or any electronic client device such as the electronic client device 902 described in conjunction with FIG. 9. The process 700 includes a series of operations wherein certificate is received and validated, such as by the authorization service 214 of FIG. 2 and/or operation 612 of FIG. 6. The process 700 may be intended to provide an Authentication, Authorization, and Accounting (AAA) framework for accessing network resources.

In 702, the system performing the process 700 receives a certificate provided by an entity attempting to establish a connection on a port of a target computing system (or other virtual or physical resource). In some cases, the system performing the process 700 may be an authorization service and the certificate may be received from a proxy that obtained the certificate from the entity. In other cases, the system performing the process 700 may be the proxy itself and may have obtained the certificate directly from the entity itself.

In 704, the system performing the process 700 may determine whether an identity of the entity requesting access (e.g., the identity associated with the principal represented by the certificate) to the resource is an identity that is authorized to access the resource. For example, the system performing the process 700 may provide the identity of the entity requesting access to an authentication service, which may, with reference to security policies and/or roles associated with the entity, determine whether the entity is allowed to have the requested access to the resource. If the identity associated with the entity does not have the required access level, the authentication service may respond to the proxy with this information to the system performing the process 700, whereupon the system may proceed to 706. As noted below, the operations of the process 700 may be performed in various orders, and, as an example, authorization of the entity in 704 may be performed in parallel with or at a time after the validation operations of 708-12.

In 706, the system performing the process 700 may respond to the proxy or requesting entity that access is denied and the process 700 may terminate. Otherwise, if the identity associated with the entity has sufficient permissions for the requested access to the resource, the system performing the process 700 may proceed to 708 to determine whether the provided certificate is valid. In 708, the system may perform one or more validation operations on the certificate, including determining whether the certificate is in a proper certificate format, whether the certificate is current or has expired, whether the certificate authority is identified, whether the certificate is signed, whether the validity period is indicated, whether the certificate has an identity code, and whether there are any limitations on the scope of the use of the certificate and, if so, whether the limitations prevent the certificate from being used in the context of accessing the resource. The operations of 708 may include validating the digital signature of the certificate authority. If the certificate is not confirmed as valid (which may indicate that the signature on the certificate is forged or that the certificate has been tampered with), the system performing the process 700 may proceed to 706, whereupon the system may respond to the proxy or requesting entity that access is denied and the process 700 may terminate.

Otherwise, if the certificate is confirmed as valid, the system performing the process 700 may proceed to 710, whereupon the system may determine whether the certificate authority that issued the certificate is trusted by the system. For example, the system may include a data store that has a list of trusted certificate authorities, and the system may determine whether the certificate was issued by a certificate authority in the list. Alternatively, the system may include a certificate authority and the system may be configured to trust only certificates issued by its own certificate authority. If the certificate authority is not determined to be trusted, the system performing the process 700 may proceed to 706, whereupon the system may respond to the proxy or requesting entity that access is denied and the process 700 may terminate.

Otherwise, if the certificate authority is confirmed to be trusted, the system performing the process 710 may proceed to 712, whereupon a digital signature included in the request may be validated using a public key assigned to the entity that was provided with the certificate. If the digital signature included in the request is confirmed as valid (indicating that the client has possession of the private key associated with the certificate), the system performing the process 700 may proceed to 714, otherwise the system may proceed to 706, whereupon the system may respond to the proxy or requesting entity that access is denied and the process 700 may terminate. In some implementations, the client can be authenticated without the client providing digitally-signed data with the request; as an example, client authentication may be accomplished by a Diffie-Hellman key exchange instead of by validating a client's digital signature associated with the certificate.

Finally, in some embodiments, in 714, the proxy, after the certificate is validated, sets a pass-through mode to be enabled for the client for its connection to the requested resource. In this way, the certificate validation may be bypassed for future connection attempts and/or further communication attempts with the resource. Note that the pass-through mode for the client may be specified to expire at a certain point, such as after 24 hours, after fourteen minutes, or to coincide with the expiration of the certificate. In some embodiments, the successful validation is logged in a data store, and in some of these embodiments, the pass-through mode is additionally or alternatively determined by determining whether successful validation is logged in the data store; in this manner, if the client attempts to access resource through a different proxy for the network, the pass-through mode for the client may still be determined with reference to the data store. The pass-through mode may be expressly disabled by storing a pass-through status of "disabled" in the data store in association with the client, or may be disabled by the current time being at or beyond an expiration date stored in the data store in association with the client for the pass-through mode. Note that pass-through mode may not be implemented in all embodiments. For example, in some embodiments, verification of a certificate is required for every connection attempt made by the client, and in such a case, a pass-through mode may not be implemented. Note also that one or more of the operations performed in 702-14 may be performed in various orders and combinations, including in parallel.

Figure 8:
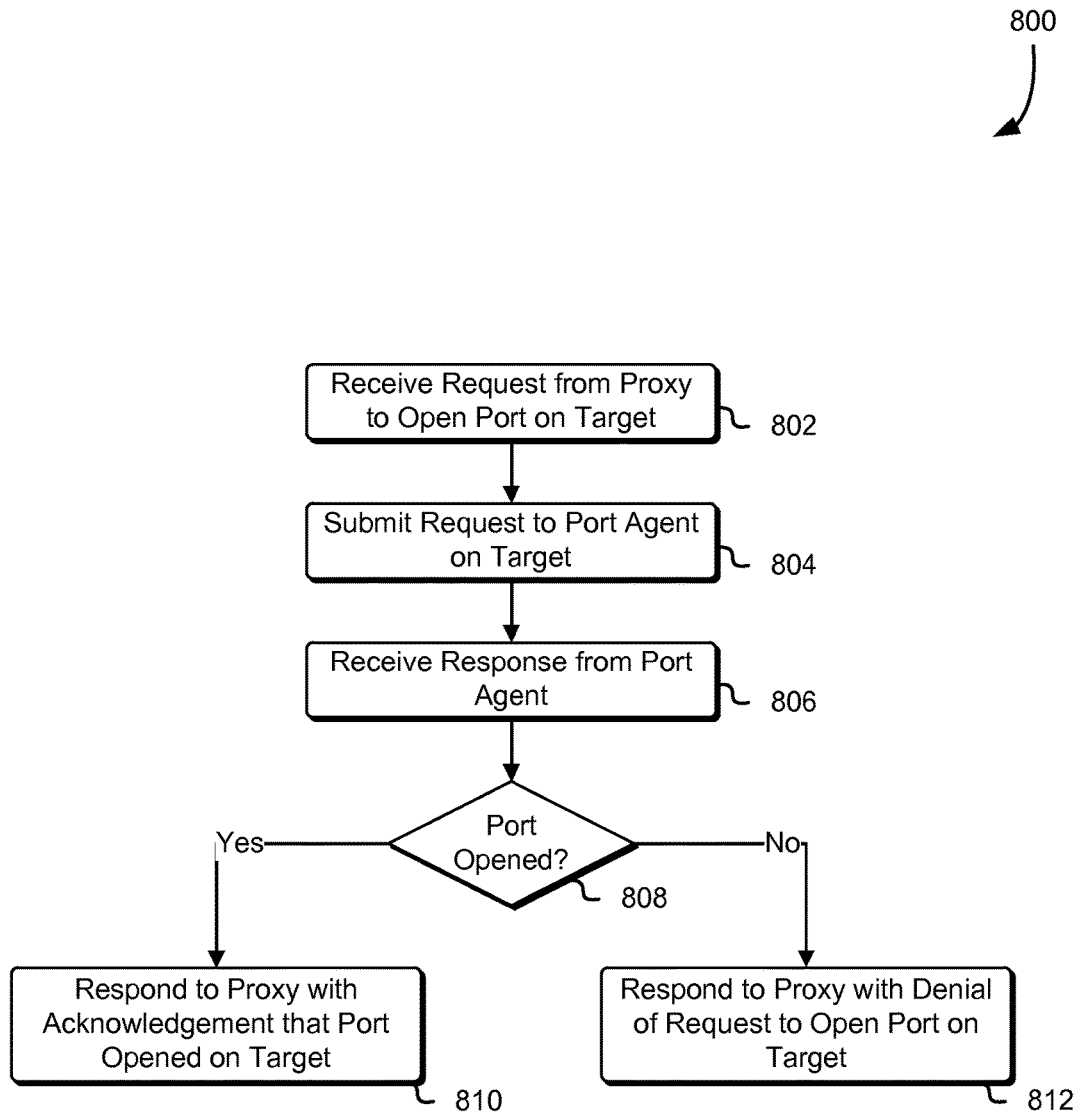
FIG. 8 is a flow chart that illustrates an example of a port management service in accordance with an embodiment.

FIG. 8 is a flow chart illustrating an example of a process 800 for a port management service or network management layer in accordance with various embodiments. The process 800 may be performed by any suitable system such as a server in a data center, multiple computing devices in a distributed system of a computing resource service provider, or any electronic client device such as the electronic client device 902 described in conjunction with FIG. 9. The process 800 includes a series of operations wherein the system performing the process 800 receives a request from a proxy of the present disclosure to open a port on the target (e.g., virtual or physical computing system), the system submits a request to open a port on the target, and responds to the proxy whether or not the port was successfully opened.

In 802, a request to open a port of a target is received from a proxy of the present disclosure. For example, a proxy may have validated a digital certificate and the identity of a client making a request to communicate on the port of the target. In 804, a request is made to a port agent on the target to open the port. As noted, in some embodiments, rather than a port agent, the system instead hooks into a virtual networking layer of a virtual network to cause the ports for the specified target computing system (e.g., a virtual server or other computing device) to be opened or closed. Thus, in these embodiments, multiple virtual computing systems may be hosted on the same physical machine, but only a specified port (or port range) for the target virtual computing system may be opened, without affecting firewall rules for the other virtual computing systems on the physical host. In 806, the system may receive a response from the port agent or virtual networking layer. Based on the response in 808, the system determines whether the response indicates that the attempt to open the specified port on the target was successful. If the port was successfully opened in 810, the system performing the process 800 may provide information indicating a successful port opening to the proxy. Otherwise, if the port opening was unsuccessful in 812, the system performing the process may notify the proxy that the port was not successfully opened. Note that one or more of the operations performed in 802-20 may be performed in various orders and combinations, including in parallel.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 904 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network 904 can be enabled by wired or wireless connections and combinations thereof. In this example, the network 904 includes the Internet, as the environment includes a web server 906 for receiving requests and serving content in response thereto, although for other networks an alternative device serving a similar purpose could be used as would be apparent to one of ordinary skill in the art.

The illustrative environment includes an application server 908 and a data store 910. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 908 can include any appropriate hardware, software and firmware for integrating with the data store 910 as needed to execute aspects of one or more applications for the electronic client device 902, handling some or all of the data access and business logic for an application. The application server 908 may provide access control services in cooperation with the data store 910 and is able to generate content including, text, graphics, audio, video and/or other content usable to be provided to the user, which may be served to the user by the web server 906 in the form of HyperText Markup Language ("HTML"), Extensible Markup Language ("XML"), JavaScript, Cascading Style Sheets ("CSS"), or another appropriate client-side structured language. Content transferred to a client device may be processed by the electronic client device 902 to provide the content in one or more forms including, forms that are perceptible to the user audibly, visually and/or through other senses including touch, taste, and/or smell. The handling of all requests and responses, as well as the delivery of content between the electronic client device 902 and the application server 908, can be handled by the web server 906 using PHP: Hypertext Preprocessor ("PHP"), Python, Ruby, Perl, Java, HTML, XML, or another appropriate server-side structured language in this example. It should be understood that the web server 906 and application server 906 are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store 910 may include mechanisms for storing production data 912 and user information 916, which can be used to serve content for the production side. The data store 910 also is shown to include a mechanism for storing log data 914, which can be used for reporting, analysis or other purposes. It should be understood that there can be many other aspects that may need to be stored in the data store 910, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server 908. In one example, a user, through a device operated by the user, might submit a search request for a certain type of item. In this case, the data store 910 might access the user information 916 to verify the identity of the user and can access the catalog detail information to obtain information about items of that type. The information then can be returned to the user, such as in a results listing on a web page that the user is able to view via a browser on the electronic client device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the example environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 904 can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 9. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   intercepting, at a proxy, a message from a client computing system addressed to a port of a target computing system, a digital signature, and a digital certificate specifying a certificate authority;
   determining that a pass-through mode is not currently enabled at the proxy for communications from the client computing system to the target computing system, the pass-through mode allowing messages from the client computing system addressed to the port of the target computing system to reach the target computing system without passing through the proxy;
   determining that the digital signature is valid, the digital certificate is valid, and that the certificate authority is specified as trusted;
   communicating with a management service to cause the management service to open the port of the target computing system for the client computing system;
   enabling the pass-through mode for communications from the client computing system to the target computing system at the proxy,
   wherein at least the digital signature and the digital certificate are communicated via a first protocol and the communications from the client computing system to the target computing system are communicated via a second protocol, different from the first protocol, wherein at least one of the proxy or the management service is configured to disable the pass-through mode; and upon the pass-through mode being disabled, requesting, from the client computing system, at least one of the digital signature or the a digital certificate specifying the certificate authority to continue to allow communication with the target computing system.

2. The computer-implemented method of claim 1, wherein the target computing system is a virtual machine instance of a virtual computer system service.

3. The computer-implemented method of claim 1, wherein the digital certificate is a short-duration digital certificate associated with a long-duration digital certificate.

4. The computer-implemented method of claim 1, wherein enabling the pass-through mode includes storing a status of enabled, in association with the client, in a data store accessible to a plurality of proxies.

5. A system, comprising: one or more processors; and memory including instructions that, as a result of execution by the one or more processors, cause the system to: receive, at a proxy, information from a client computing system addressed to a port of a target computing system, the information including authorization information and associated with a first communication protocol, wherein the authorization information comprises at least a digital signature and a digital certificate;
  determine that a pass-through mode is not currently enabled at the proxy for communications from the client computing system to the target computing system, the pass-through mode allowing messages from the client computing system addressed to the port of the target computing system to reach the target computing system without being accessed by the proxy;
  perform a set of validation operations on the authorization information received with the information; and as a result of the set of validation operations resulting in successful authentication of the client computing system: cause the port of the target computing system to be opened; and allow data to be communicated from the client computing system to the port of the target computing system via a second communication protocol different from the first protocol, without passing through the proxy in the pass-through mode, wherein the system is configured to disable the pass-through mode, and wherein upon the pass-through mode being disabled, allowing the client computing system to continue to communicate with the target computing system upon the client computing system resending at least one of the digital signature or the a digital certificate specifying the certificate authority.

6. The system of claim 5, wherein the instructions that cause the system to cause the port of the target computing system to be opened, further include instructions that, as a result of execution by the one or more processors, cause the system to submit a request to a port agent executing on the target computing system to open the port on the target computing system.

7. The system of claim 5, wherein:
  the target computing system is a virtual machine instance in a virtual network; and
  the instructions that cause the system to cause the port of the target computing system to be opened further include instructions that, as a result of execution by the one or more processors, cause the system to submit a request to a virtual networking layer of the virtual network to allow the data to be communicated from the client computing system to the port of the target computing system.

8. The system of claim 5, wherein the authorization information is caused to be provided to the system from the client computing system by a computing resource service provider-provided wrapper function executing on the client computing system.

9. The system of claim 5, wherein the information received from the client computing system is received as a Hypertext Transfer Protocol request.

10. The system of claim 5, wherein the data communicated from the client computing system to the port of the target computing system is received by the proxy and forwarded to the target computing system.

11. The system of claim 5, wherein the instructions that cause the system to allow the data to be communicated from the client computing system to the port of the client computing system include instructions that reconfigure a network of the target computing system such that the data goes directly to the target computing system without being received by the proxy.

12. The system of claim 5, wherein the instructions that cause the system to perform the set of validation operations on the authorization information further include instructions that, as a result of execution by the one or more processors, cause the system to:
  determine that the digital certificate is valid; and
  determine that a certificate authority that issued the digital certificate is specified as trusted.

13. A non-transitory computer-readable storage medium having stored thereon executable instructions that, as a result of execution by one or more processors of a computer system, cause the computer system to at least:
  authenticate a client computing system by at least performing, at an authentication system different than a target computing system, a set of validation operations on authorization information included in a communication addressed to a destination port of the target computing system wherein the authorization information comprises at least a digital signature and a digital certificate;
  determine that a pass-through mode is not currently enabled at the authentication system for communications from the client computing system to the target computing system, the pass-through mode allowing messages from the client computing system addressed to the port of the target computing system to reach the target computing system without being accessed by the authentication system; and
  as a result of the client computing system being authenticated by the set of validation operations, switch to a pass-through mode wherein a port of the target computing system is opened and data from the client computing system is communicated to the port of the target computing system without passing through the authentication system, wherein the authorization information is provided under a first protocol and the data is communicated to the port of the target computing system under a second protocol, different from the first protocol, wherein the authentication system is configured to disable the pass-through mode, wherein upon the pass-through mode being disabled, the client computing system resends at least one of the digital signature or the a digital certificate specifying the certificate authority to continue to communicate with the target computing system.

14. The non-transitory computer-readable storage medium of claim 13, wherein the port of the target computing system that is opened is a different port from the destination port of the target computing system to which the communication was addressed.

15. The non-transitory computer-readable storage medium of claim 13, wherein the instructions that cause the computer system to the set of validation operations include one or more of verifying the digital signature of the client computing system, verifying a digital signature of a certificate authority, validating information in the digital certificate, or verifying that a certificate authority is specified as a trusted certificate authority.

16. The non-transitory computer-readable storage medium of claim 13, wherein:
   the target computing system is a computing system of a customer of a computing resource service provider;
   the customer specifies through an interface provided by the computing resource service provider whether a certificate authority is trusted by the target computing system; and
   the set of validation operations include verifying that the certificate authority has been specified by the customer as trusted by the target computing system.

17. The non-transitory computer-readable storage medium of claim 13, wherein the data is communicated to the port of the target computing system under the second protocol without using the first protocol.

18. The non-transitory computer-readable storage medium of claim 17, wherein the first protocol is a Transport Layer Security or Secure Sockets Layer protocol.

19. The non-transitory computer-readable storage medium of claim 13, wherein the instructions further include instructions that, as a result of execution by the one or more processors, cause the computer system to, based at least in part on the validation:
   set a timeout for the opened port; and
   close the opened port when the timeout for the opened port is reached.

20. The non-transitory computer-readable storage medium of claim 19, wherein the timeout is an idle timeout and the opened port is closed if the target does not receive any data from the client computing system for an amount of time equal to or more than the idle timeout.

* * * * *